United States Patent [19]

Sugata et al.

[11] Patent Number: 4,568,149

[45] Date of Patent: Feb. 4, 1986

[54] LIQUID CRYSTAL DISPLAY PANEL WITH OPAQUE MASK OVER GATE OR SIGNAL LINE

[75] Inventors: Masao Sugata, Yokohama; Yuko Miyajima, Tokyo, both of Japan

[73] Assignee: Canon Kabushiki Kaisha, Tokyo, Japan

[21] Appl. No.: 571,826

[22] Filed: Jan. 19, 1984

[30] Foreign Application Priority Data

Jan. 28, 1983 [JP] Japan ................................. 58-13561

[51] Int. Cl.[4] ............................................. G02F 1/13
[52] U.S. Cl. .............................. 350/334; 350/339 F; 350/339 R
[58] Field of Search ............... 350/339 F, 344, 339 R, 350/334

[56] References Cited

U.S. PATENT DOCUMENTS 4,448,491  5/1984  Okubo ................................. 350/344

FOREIGN PATENT DOCUMENTS

56-25174  3/1981  Japan ............................... 350/339 F

Primary Examiner—John K. Corbin
Assistant Examiner—Richard F. Gallivan
Attorney, Agent, or Firm—Fitzpatrick, Cella, Harper & Scinto

[57] ABSTRACT

A display panel comprises a pair of electrode plates oppositely spaced from each other. One of the electrode plates has switching elements provided with gate lines and source lines, and the other electrode plate has counter electrodes thereon. At least one of the pair of electrode plates is provided along at least one of gate lines and the source lines with non-transmissive members, and spacer members are provided between the pair of electrode plates along the non-transmissive members.

13 Claims, 9 Drawing Figures

LIQUID CRYSTAL DISPLAY PANEL WITH OPAQUE MASK OVER GATE OR SIGNAL LINE

BACKGROUND OF THE INVENTION

1. Field of the Invention

The present invention relates to a matrix type display panel, and more particularly to an active matrix type liquid crystal display panel formed with matrix electrode plates in which a driving switching element array is integrally provided.

2. Description of the Prior Art

Typical advantages given by liquid crystal display panels are as follows:

(1) Being passive display devices, requiring small power consumption.

(2) Low voltage operation is possible.

(3) Display devices of panel structure are easily constituted.

(4) Large-sized display is possible.

Luminescent (active) display devices cannot provide these advantages.

Among such liquid crystal display panels, an attention is paid particularly to a liquid crystal display panel employing a matrix-driving scheme for a plurality of picture elements as disclosed in U.S. Pat. No. 3824003 (Japanese Laid-open Patent Application No. 17599/1975).

Figure 1A:
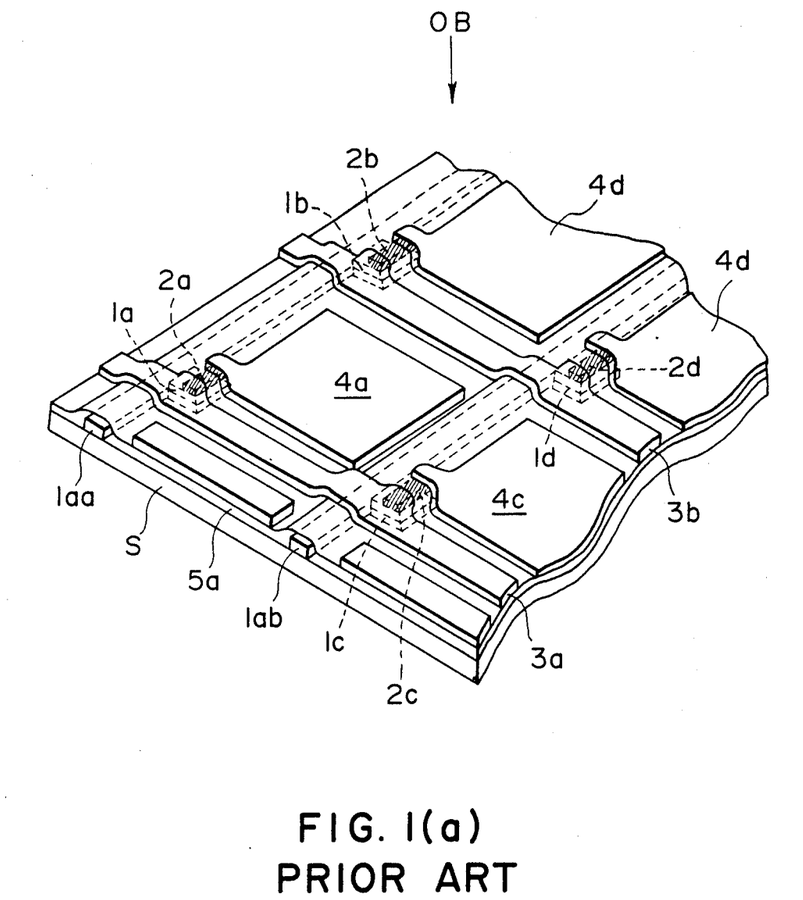
FIG. 1(a) is a partial perspective view illustrating an electrode plate used in a prior art display panel.

The liquid crystal display panel of this type has a structure, for instance, as shown in FIG. 1(a).

An electrode plate (of glass, plastic film, etc.) constituting a display panel is formed by arranging thin film transistors (each of which will be called "TFT" hereinafter) for driving in the form of a matrix with a density of about 2 to 10 lines/mm.

TFTs have several types of structure. In this embodiment, by way of example, so called "stagger structure" in which gate electrodes as shown in FIG. 1(a) are formed on an electrode plate will be described.

The TFT comprises gate lines 1aa, 1ab, . . . (row electrodes) formed on an electrode plate S, gate electrodes 1a, 1b, 1c, 1d . . . provided on the gate lines, insulating layers one of which is designated by 5a stacked on gate electrodes, thin film semiconductor layers 2a, 2b, 2c, 2d, . . . formed on gate electrodes through the insulating layers, source lines 3a, 3b, . . . (column electrodes) provided close to one end of each semiconductor, drain electrodes 4a, 4b, 4c, 4d, . . . (electrodes constituting display units) provided close to the other end of each semiconductor, etc. The row electrodes an column electrodes are formed of transparent or non-transparent (e.g., metallic) film conductive layers.

Figure 1B:
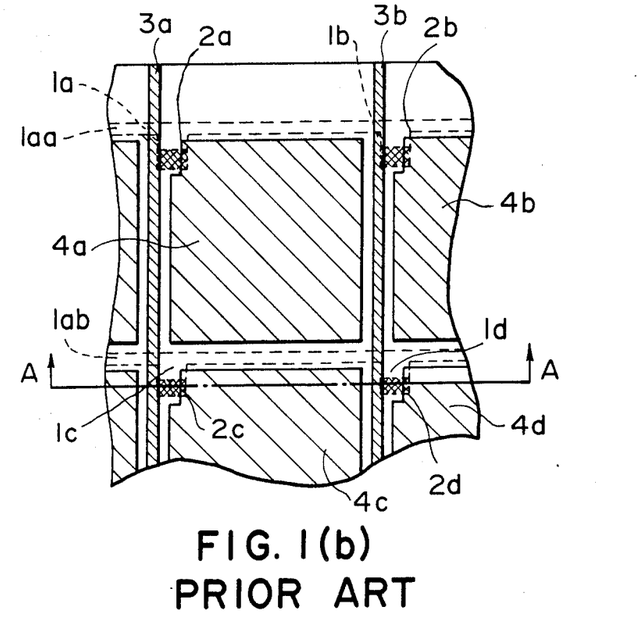
FIG. 1(b) is a partial plan view of the electrode plate shown in FIG. 1(a)

FIG. 1(b) is a plan view which is viewed in the direction of an arrow OB of FIG. 1(a), partially showing a matrix driving circuit.

Figure 2:
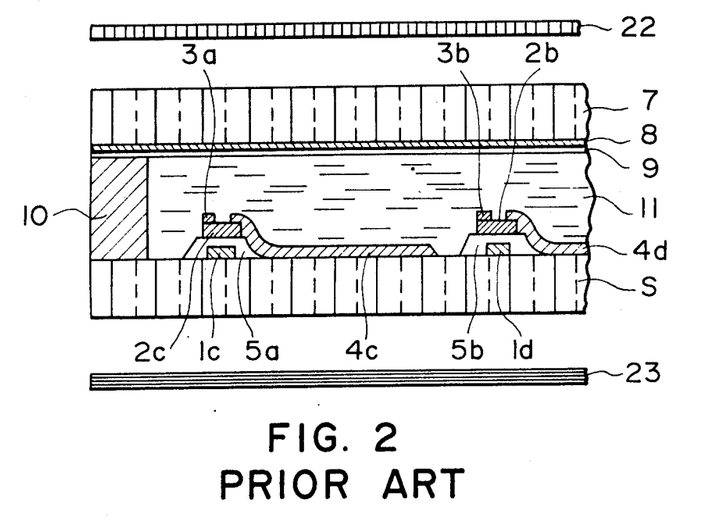
FIG. 2 is a cross sectional view of the prior art display panel.

FIG. 2 shows a cross sectional view of the display panel formed with electrode plates having cross sectional structure taken along the line A—A of FIG. 1(b).

In FIG. 2, reference numerals 7 and S designate electrode plates of glass, plastic film, etc., reference numerals 4c and 4d designate the above-mentioned drain electrodes, and reference numeral 8 designates a counter electrode.

The drain electrodes 4c and 4d, and the counter electrode 8, etc. are formed of a transparent conductive film of $SnO_2$, $In_2O_3$, ITO, etc., or a metallic film of Au, Al, Pd, etc.

As previously mentioned, reference numerals 1c and 1d, and 3a and 3b designate gate electrodes and source electrodes, respectively, both of which are formed of a metallic film of Al, Au, Ag, Pd, etc.

Reference numerals 5a, 5b and 9 designate insulating layers. Reference numerals 2c and 2d designate thin film semiconductors of amorphous silicon, polysilicon, CdS, CdSe, etc. Reference numeral 10 designates a seal member. Reference numeral 11 designates a liquid crystal layer.

In the liquid crystal display panel thus formed, there is employed a display mode, e.g. the dynamic scattering mode (DSM), the twisted nematic (TM) mode, etc.

When a display device formed with a liquid crystal display panel is designed as a transmissive type or reflective type device, optical detecting means such as a polarizing plate, a λ/4 plate, reflective plate, etc., may optionally be required. Particularly, when the TM mode is employed as a display mode of the display panel, a polarizer 22 and an analizer 23 are used as optical detecting means.

With display panels thus formed, operating characteristics of the liquid crystal cell highly depend upon the thickness of the liquid crystal layer and overall display characteristics of the display panel are apt to be degraded. For this reason, in order to obtain preferable gradation and high-speed response characteristic, it is required that the thickness of the liquid crystal layer is as thin and uniform as possible (for instance, a few μm to 10 μm) over a certain area or wider (for instance, more than 10 cm$^2$).

From this point of view, in order to keep constant the thickness of liquid crystal layer, there is well known a method of mixing inactive members each having a predetermined particle diameter into the liquid crystal layer. However, with this method, it is difficult to mix the inactive members uniformly over an overall broad display surface, and the orientation of liquid crystal molecules can be disturbed at some portions at image display units or elements. Accordingly, this method cannot practically be used.

SUMMARY OF THE INVENTION

With the above in view, an object of the present invention is to provide a liquid crystal display panel capable of easily ensuring a uniform gap entirely over a broad display surface.

Another object of the present invention is to provide a display cell which keeps constant a very small gap between electrode plates and gives display of good gradation and responsiveness thereby to provide a liquid crystal display panel in which alignment or orientation of liquid crystal molecules is not disturbed on an image display surface, and which shows excellent display characteristics.

A further object of the invention is to provide a liquid crystal display panel with a good color representation characteristic.

These and other objects are accomplished by a display panel comprising one electrode plate having switching elements provided with gate lines and source lines, and the other electrode plate having opposite electrodes. At least one of the two plates is provided with non-transmissive member along at least one of the gate lines and the source lines, and a spacer is provided between the two plates along the non-transmissive member.

DESCRIPTION OF THE PREFERRED EMBODIMENTS

A display panel according to the present invention may be constituted, for example, as follows:

(1) Row electrodes or column electrodes per se for selectively driving a large number of segments are formed as non-transmissive members, and spacer members are disposed along the non-transmissive members.

(2) Non-transmissive members are formed, along row electrodes or column electrodes, on an electrode plate opposite to an electrode plate on which semiconductor driving elements are provided, and spacer members are disposed along the non-transmissive members.

Further, when forming the spacer member, it is preferable to fix them to at least one of the two electrode plates. The arrangement in connection with this embodiment will be described with reference to FIGS. 3(a) and 3(b).

Figure 3A:
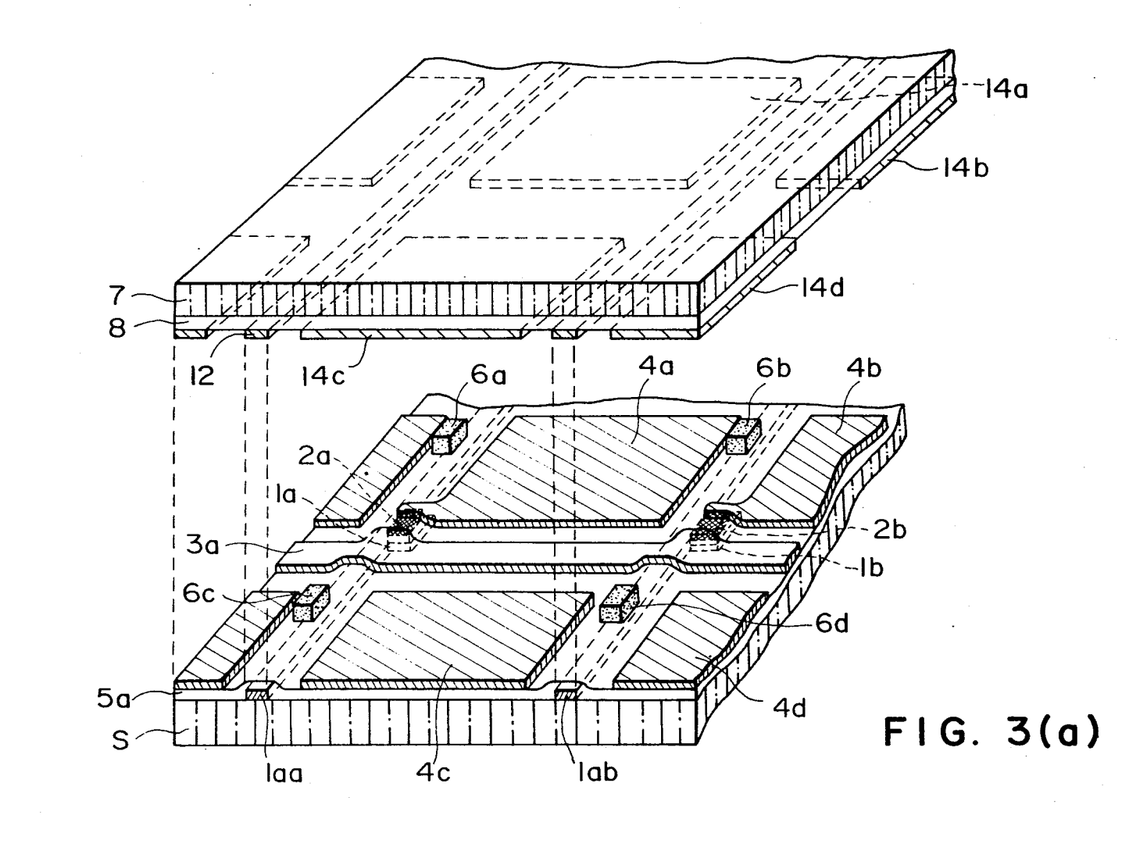
FIGS. 3(a) and 3(b) are perspective views each illustrating a display panel according to the present invention.

FIG. 3(a) is a perspective view illustrating an example of a display panel according to the present invention.

In the liquid crystal display panel, spacer members 6a, 6b, 6c, 6d, . . . are fixed on row electrodes 1aa, 1ab, . . . (or on column electrodes 3a, 3b, etc., while not shown in this Figure) on the electrode plate S through the insulating layer 5a.

The thickness of the spacer members determines the thickness of the liquid crystal layer. At positions on the electrode 8 of the counter electrode plate opposite to the row electrodes 1aa, 1ab, . . . , etc., non-transmissive members 12 are provided, respectively.

The pattern of non-transmissive members 12 may be stripes, mosaic or the like, or may be the same as that of the spacer members. It is sufficient to provide non-transmissive members 12 along the alignment lines of either row electrodes or column electrodes.

The non-transmissive member 12 may be formed of a film of metals such as Al, Cr, Mo, etc., or a colored organic material. The non-transmissive member 12 are disposed between color filters 14a, 14b, 14c, 14d, . . . , and function as so-called "black stripes", i.e. function to intensify color contrast between display units and to apparently improve the clarity of color, when effecting a full color display, if they are formed in stripes having substantially the same widths as those of the row and/or column electrodes.

The thickness of the non-transmissive member is so selected that the light transmittance is suppressed below 20% and is preferably within the range of 500 to 1500 Å for metallic films. In the display panel according to the present invention, each of drain electrodes 4a, 4b, 4c, . . . serves as a display unit for forming a display image. At positions corresponding to respective drain electrodes 4a, 4b, 4c, . . . , color filters 14a, 14b, 14c, . . . are disposed on the side of the counter electrode plate 7, whereby a color display unit can be formed by the combination of a drain electrode and a color filter corresponding thereto. One of the color filters 14a, 14b, 14c, . . . has a color selected from blue, green and red. If adjacent color filters are formed in blue, green and red, respectively, full color display is performed. Such color filters are produced by appropriate segments or dyes. For instance, a red filter is formed by a film dyed or colored by a red dye of, for example, carotene pink, brilliant red 4 GH, brilliant red BLH, etc. A green filter may be formed by a film dyed or colored by a green dye material of diamond green GH, malachite green, lead phthalocyanine, etc. A blue filter may be formed by a film dyed or colored by blue material of basic cyanine 6 GH, carotene blue GH, copper phthalocyanine, etc. may be used. A color film forming a color filter may be formed as a colored plastic film or as a film of a dye or pigment per se formed by vapor deposition thereof.

Each surface of two electrode plates in contact with the liquid crystal may be coated with an insulating material. An insulating material used for this purpose can be obtained by forming a coating of an inorganic compound such as $SiO$, $SiO_2$, $MgF_2$, etc. or an organic compound such as a polyimide, polyamide, polyvinyl alcohol, polyparaxylene, etc. through a suitable coating process. To the insulating film of this type, an orientation controlling treatment is applied for orientating in one direction the molecular axes of liquid crystals contacting the insulating film. As a typical process for the orientation-controlling treatment, the surface of the insulating film is rubbed in one direction with a velvet or cloth or the insulating film is provided as a film of $SiO$ or $SiO_2$ formed by the oblique deposition process.

In a preferred embodiment of the invention, a TN (twisted nematic) type liquid crystal may be used, as disclosed, for example, by M. Schadt and W. Helfrich, "Applied Physics Letters" vol. 18, No. 4 (Feb. 15, 1971) p. 127 to 128, "Voltage-Dependent Optical Activity of a Twisted Nematic Liquid Crystal". In the liquid crystal of this type, under no application of an electric field, molecules of nematic liquid crystal having a positive dielectric anisotropy form a twisted structure (helical structure) and in which liquid crystal molecules are aligned in parallel with each other on the both electrode surfaces and the direction of the molecular alignment gradually changes in the direction of the thickness of the liquid crystal layer to form a helix. On the contrary, under application of an electric field, the molecules of the nematic liquid crystal having a positive dielectric anisotropy are aligned in the direction of the electric field, whereby an optical modulation effect is produced.

Figure 3B:
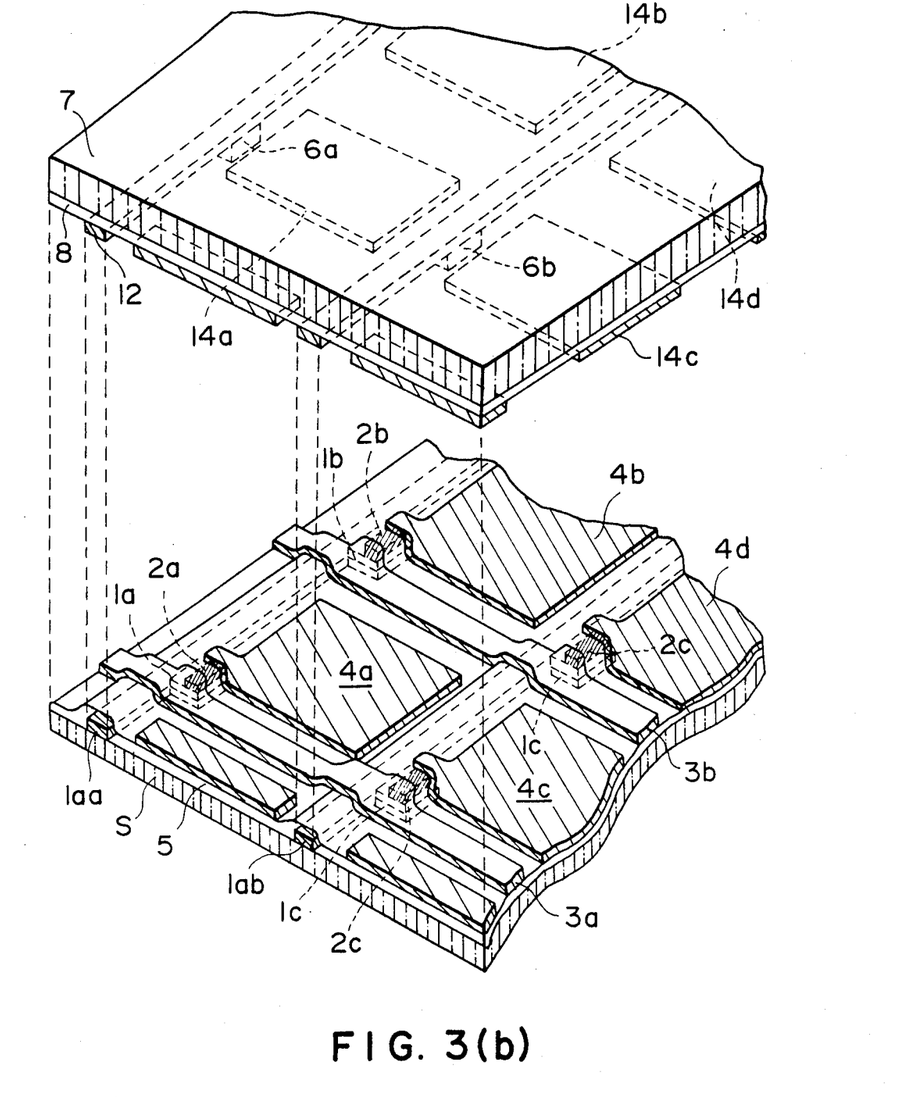

FIG. 3(b) shows another embodiment of the display panel according to the present invention. Referring to FIG. 3(b), on an electrode plate 7 provided with counter electrodes 8 of the liquid crystal panel are formed non-transmissive members 12 and color filters 14a, 14b, 14c, etc., which are coated with an insulating layer (not shown). Further, spacer members 6a, 6b, 6c, 6d, . . . are disposed on the insulating layer along the non-transmissive members 12. When the electrode plate 7 thus formed is disposed so as to face the electrode plate S having thereon semiconductor driving elements 2a, 2b, 2c, 2d, . . . row electrodes 1aa, 1ab, . . . , and column electrodes 3a, 3b, . . . , the above-mentioned non-transmissive members 12 are disposed along the alignment lines of row electrodes 1aa, 1ab, . . . (or column electrodes 3a, 3b, . . . ). Thus, it is embodied that spacer members 6a, 6b, 6c, 6d, . . . are disposed in non-transmissive sections. As will be understood, reference numerals in FIGS. 3(a) and 3(b) identical with those in FIGS. 1(a), 1(b) and FIG. 2 denote the same or corresponding parts, respectively.

Figure 4A:
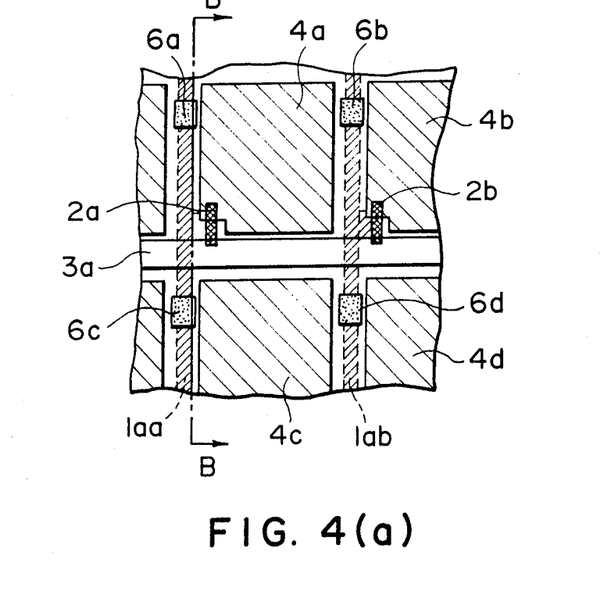
FIG. 4(a) is a plan view illustrating a display panel according to the present invention.
Figure 4B:
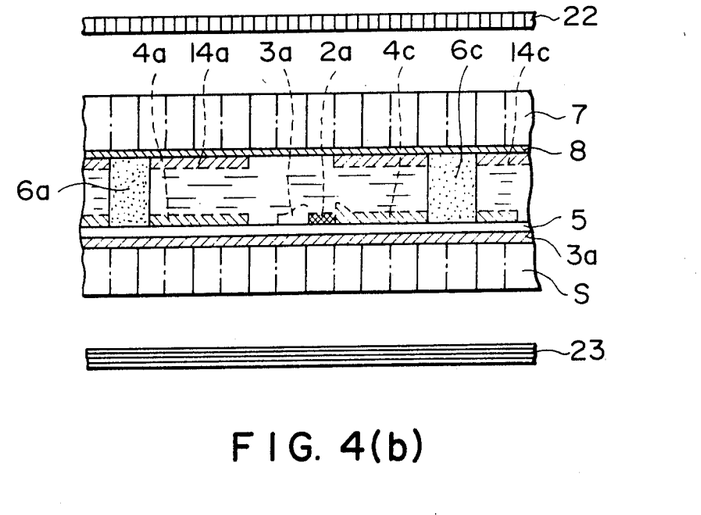
FIG. 4(b) is a cross sectional view taken along the line B—B of FIG. 4(a)

FIG. 4(a) is a plan view illustrating an electrode plate provided with electrodes, etc. for the display panel shown in FIG. 3(a) or 3(b). FIG. 4(b) shows the display panel cut in cross section taken along the line B—B of FIG. 4(a).

Spacer members 6a, 6b, 6c, 6d, . . . shown in FIGS. 3 and 4 may be formed of any material, as far as it is chemically stable and can form a layer having a predetermined thickness whereas inorganic compounds or organic resins of insulating property are preferable materials.

Examples of the insulating inorganic material include a metal oxide such as, silicon oxide, titanium oxide, and celium oxide and a nitride such as silicon nitride.

Examples of the insulating organic resin include silicone resins, rubbery resins, etc.

Spacer members 6a, 6b, 6c, 6d, . . . may be spot-shaped, line-shaped or polygon-shaped. In any shape, fine structure as shown is preferable. More specifically, a spacer member should be substantially size than a display unit, especially shorter than the side of a display unit in parallel therewith, or should preferably have a width of from 10 to 30μ and a length of 20–80μ.

Spacer members may be made of a material different from, or of the same material as that of the insulating layer 5.

Spacer members 6a, 6b, 6c, 6d, . . . , etc. may be formed by vapor deposition, sputtering and the like with a mask having a predetermined pattern, or by forming a uniform film having a thickness substantially equally to that of the liquid crystal layer by vapor deposition, sputtering coating or the like and then patterning the film through etching of portions other than those forming spacers.

Figure 5:
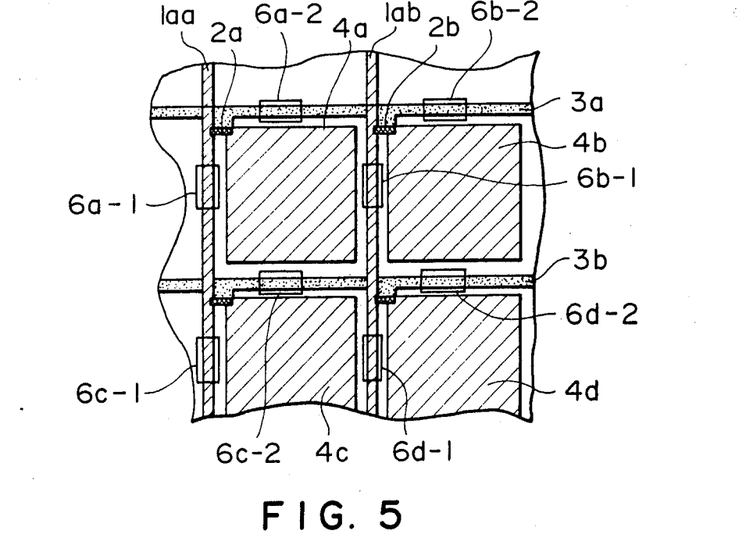
FIG. 5 is a plan view illustrating another embodiment of a display panel according to the present invention.

Referring to FIG. 5, there is shown a plan view showing an example wherein spacer members 6a-1, 6b-1, 6c-1, . . . 6a-2, 6b-2, 6c-2, . . . are provided on row electrodes 1aa, 1ab, . . . , and column electrodes 3a, 3b, 3c, . . . , and wherein spacer members denoted by reference numerals 6a-1, 6b-1, 6c-1, 6d-1 are provided on the row electrodes, and spacer members denoted by reference numerals 6a-2, 6b-2, 6c-2, 6d-2 are provided on the column electrodes.

In a typical example, a glass electrode plate having the thickness of 0.5 mm is used and one spacer member is provided per square centimeter, whereby a display panel having an uniform gap of 4 μm and a display area of 100 cm² can be obtained.

As seen from FIG. 4(b), when spacer members are formed on column electrodes (3a, 3b, 3c, 3d, etc.), an electrical short due to contact with the counter electrode 8 can be prevented even in the case of an extremely small gap.

If the thickness of the liquid layer is kept constant, a spacer member is not necessarily provided to each of drain electrodes (4a, 4b, 4c, 4d, etc.) constituting display segments.

Figure 6:
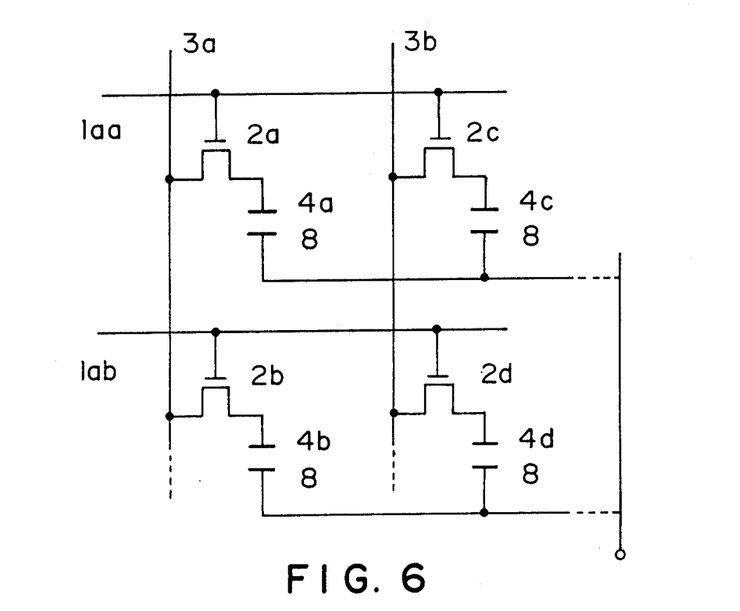
FIG. 6 is an explanatory view showing an equivalent circuit of a semiconductor driving circuit used in a display panel according to the present invention.

Referring now to FIG. 6, there is shown an equivalent circuit of a semiconductor driving circuit for use in the display panel according to the present invention. A driving method for this circuit is referred to below. Scanning signals are sequentially applied to row electrodes 1aa, 1ab, etc., whereby the TFTs to which the scanning signals are applied are placed in conductive state. At this time, when image signals are fed to column electrodes 3a, 3b, 3c . . . perpendicular to the row electrodes, voltages corresponding to the signals are fed to drain electrodes 4a, 4b, 4c, etc. By sequentially shifting scanning signals to an adjacent row electrode, when the TFT located in each row is turned on, voltages are supplied to a group of drain electrodes belonging to the row. Thus, when the cyclic scanning operation to the overall row electrodes is finished, image signals are supplied to all the picture elements. It is preferable that, in order to improve an effective voltage fed to the group of drain electrodes, the voltage supply to column electrodes is effected by line-by-line scanning in place of point-by-point scanning which sequentially feeds signals to each picture element. Namely, it is preferable to employ a scanning scheme features by concurrently feeding signals to overall drain electrodes corresponding to a row which is placed in "on" state.

Thus, on condition that signals are input to row electrodes, a selected column electrode and a drain electrode become conductive with each other at a selected intersectint point among intersecting points of the electrode matrix. Thus, a voltage is applied to a portion between the concerned drain electrode and counter electrode 8. As a result, the orientation of liquid crystal molecules varies in accordance with the applied voltage and a corresponding display is obtained.

The following advantages are, for example, given by the present invention:

(1) The spacer member employed in the present invention can maintain a gap between electrode plates to be constant, as compared with a conventional seal member which is provided solely along the peripheral portion of an electrode plate.

(2) The spacer members employed in the present invention are provided at non-transmissive parts of a display surface, whereby the orientation of liquid crystal molecules in the image display surface is not disturbed.

(3) According to the present invention, spacer members are locally provided on a display surface. Accordingly, even when either one or both of display electrode plate provided with semiconductor driving elements and the counter electrode plate is formed with a flexible film, the advantages referred to in the first and second items (1) and (2) can be obtained.

In contrast thereto, the conventional system has drawbacks with respect to the first item as follows:

(a) The seal portion (designated by reference numeral 10 in FIG. 2) required function as a spacer member for keeping the gap between electrode plates to be constant, is also required to function as a seal member for filling a liquid crystal. For this reason, a material for the seal member has to be selected from limited materials.

(b) When an electrode plate is made thin, the electrode plate is readily susceptible to deformation. Accordingly, it is practically impossible to maintain a small gap of e.g. 4 to 10 μm, between electrode plates.

(c) Since the seal member is readily deformable, the distance of the gap between electrode plates locally varies in a display cell. As a result, there often occurs a lack of uniformity in display characteristics. The distance of the gap between electrode plates in a display cell is apt to change.

However, the present invention can solve the drawbacks of the conventional system as mentioned above.

The conventional system also has drawbacks in respect to the item (2) above as follows; A spacer member provided on a display surface somewhat disturbs alignment of liquid crystal molecules in portions where the spacer members are provided, whereby the quality of an image in a display surface is sometimes deteriorated to some extent. The present invention can eliminate this drawback.

Moreover, with respect to the item (3), namely in the case that at least one of display electrode plates provided with semiconductor driving elements and the counter electrode plate, is formed with a flexible film, the drawbacks with the conventional system can be solved by the present invention.

Further, the present invention has an advantage that it is possible to obtain a display having excellent gradation and responsiveness.

In addition to these advantages, with the display panel according to the present invention, particularly when effecting a color display with color filters formed corresponding to drain electrodes, the portions between picture elements are partitioned by non-transmissive members, thereby making it possible to present a sharp distinction between colors, i.e. so-called "black-stripe" effects.

The display panel of the invention may be applied to a projection type, a transmission type or a reflective type display.

Any display mode may be selected, which is, for instance, the dynamic scattering mode (DSM), the twisted nematic (TM) mode, the phase transition mode, the vertical-horizontal alignment effect type (DAP), or the hybrid nematic (HAN) type, etc.

In accordance with a desired display type selected from the above-mentioned display modes, an initial orientation of liquid crystal molecules is suitably determined, and optical detecting means (polarizing plate, λ/4 plate, reflective plate, etc.) is optionally provided.

As a thin and compact display panel, the display panel according to the present invention is applicable to various kinds of panel displays, for instance, a display plate for a watch, a computer, etc., a small sized television, and a monitor device and a finder, etc. for a video camera.

What is claimed is:

1. In a display panel comprising a pair of electrode plates oppositely spaced from each other, one electrode plate having switching elements provided with gate lines and source lines, the other electrode plate having a counter electrode thereon, the improvement wherein:
   (a) at least one of said pair of electrode plates is provided with a non-transmissive member along at least one of said gate lines and said source lines, said non-transmissive member being formed as a stripe having substantially the same width as one of the gate lines or source lines, and
   (b) a spacer member is interposed between said pair of electrode plates along said non-transmissive member.

2. A display panel according to claim 1, wherein a liquid crystal is interposed between said pair of electrode plates.

3. A display panel according to claim 2, wherein said liquid crystal is a nematic liquid crystal.

4. A display panel according to claim 1, wherein said non-transmissive member is formed of a metallic film.

5. A display panel according to claim 1, wherein said metallic film is a film of chromium.

6. A display panel according to claim 1, wherein said switching element is comprised of a thin film transistor comprising a gate electrode, a thin film semiconductor insulated from said gate electrode with an insulating film, and a source electrode and a drain electrode respectively connected to said thin film semiconductor.

7. A display panel according to claim 6, wherein said thin film semiconductor comprises amorphous silicon.

8. A display panel according to claim 1, wherein said spacer member is formed in a size smaller than a display unit.

9. A display panel according to claim 1, wherein said spacer member has been produced by forming a film of an insulating material on at least one of electrode plates, and then etching the film of a insulating material except for the portion thereof forming the spacer member.

10. A display panel according to claim 9, wherein said insulating material comprises a resin.

11. In a display panel comprising first and second electrode plates oppositely spaced from each other, and a liquid crystal interposed between said first and second electrode plates; said first electrode plate having switching elements provided with gate lines, source lines and drain electrodes constituting display units, said second electrode plate having a counter electrode thereon; the improvement wherein said second electrode plate comprises color filters disposed to face said drain electrodes, and a non-transmissive metallic film disposed between an adjacent pair of said color filters and along at least one of said gate lines and said source lines.

12. A display panel according to claim 11, wherein one of said color filters has a color selected from blue, green and red.

13. A display panel according to claim 11, wherein said non-transmissive metallic film is a film of chromium, aluminum or molybdenum.

* * * * *

UNITED STATES PATENT AND TRADEMARK OFFICE
CERTIFICATE OF CORRECTION

PATENT NO. : 4,568,149

DATED : February 4, 1986         Page 1 of 2

INVENTOR(S) : MASAO SUGATA, ET AL.

It is certified that error appears in the above-identified patent and that said Letters Patent is hereby corrected as shown below:

```
Column  1, line 50,    "close the" should be --close to the--.
Column  1, line 52,    "an column" should be --and column--.
Column  1, line 59,    "cross sectional" should be --cross-
                       sectional--.
Column  1, lines 60-61, "cross sectional" should be --cross-
                       sectional--.
Column  2, line 22,    "analizer" should be --analyzer--.
Column  3, line 10,    "cross sectional" should be --cross-
                       sectional--.
Column  3, line 11,    "cross sectional" should be --cross-
                       sectional--.
Column  3, line 62,    "member 12" should be --members 12--.
Column  4, line  1,    "full color" should be --full-color--.
Column  4, line 18,    "full color" should be --full-color--.
Column  4, lines 43-44, "a velvet or cloth or" should be
                       --a velvet cloth or--.
Column  4, line 56,    "aligned in parallel with" should be
                       --aligned paralled with--.
```

UNITED STATES PATENT AND TRADEMARK OFFICE
CERTIFICATE OF CORRECTION

PATENT NO. : 4,568,149

DATED : February 4, 1986

INVENTOR(S) : MASAO SUGATA, ET AL.

It is certified that error appears in the above-identified patent and that said Letters Patent is hereby corrected as shown below:

Column 5, line 30, "nitrode" should be --nitride--.
Column 5, line 36, "substantially size than" should be --substantially smaller in size than--.
Column 6, line 29, "features" should be --featured--.
Column 6, line 35, "intersectints points" should be --intersecting point--.
Column 6, line 64, "required function" should be --required to function--.
Column 8, line 36, "a insulating" should be --an insulating--.

Signed and Sealed this

Sixth Day of January, 1987

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,568,149 C1
DATED : April 9, 2002
INVENTOR(S) : Sugata et al.

It is certified that error appears in the above-identified patent and that said Letters Patent is hereby corrected as shown below:

<u>Title page,</u>
Item [73], Assignee, "Canon Kabushiki," should read -- Canon Kabushiki Kaisha, --.
Item [57], ABSTRACT,
Line 6, "liness" should read -- lines --.

Signed and Sealed this

Eighteenth Day of June, 2002

*Attest:*

JAMES E. ROGAN
*Attesting Officer*   *Director of the United States Patent and Trademark Office*

REEXAMINATION CERTIFICATE (2750th)

United States Patent [19]
Sugata et al.

[11] B1 4,568,149
[45] Certificate Issued Dec. 12, 1995

[54] LIQUID CRYSTAL DISPLAY PANEL WITH OPAQUE MASK OVER GATE OR SIGNAL LINE

[75] Inventors: Masao Sugata, Yokohama; Yuko Miyajima, Tokyo, both of Japan

[73] Assignee: Canon Kabushiki Kaisha, Tokyo, Japan

Reexamination Request:
No. 90/003,770, Mar. 28, 1995

Reexamination Certificate for:
Patent No.: 4,568,149
Issued: Feb. 4, 1986
Appl. No.: 571,826
Filed: Jan. 19, 1984

Certificate of Correction issued Jan. 6, 1987.

[30] Foreign Application Priority Data

Jan. 28, 1983 [JP] Japan ................................. 53-13561

[51] Int. Cl.⁶ .................. G02F 1/1343; G02F 1/1335; G02F 1/1339
[52] U.S. Cl. ...................... 359/59; 359/58; 359/67; 359/68; 359/81
[58] Field of Search ................... 359/59, 67, 68, 359/81

[56] References Cited

U.S. PATENT DOCUMENTS

| | | | |
|---|---|---|---|
| 4,448,491 | 5/1984 | Okubo | 359/67 |
| 4,470,667 | 9/1984 | Okubo et al. | 359/67 |
| 4,600,274 | 7/1986 | Morozumi | 359/67 |

FOREIGN PATENT DOCUMENTS

| | | |
|---|---|---|
| 49-24454 | 3/1974 | Japan . |
| 56-25714 | 3/1981 | Japan . |
| 56-27114 | 3/1981 | Japan . |
| 56-25777 | 3/1981 | Japan . |
| 56-38008 | 4/1981 | Japan . |
| 56-36626 | 4/1981 | Japan . |
| 56-57084 | 5/1981 | Japan . |
| 57-17281 | 1/1982 | Japan . |
| 57-190923 | 11/1982 | Japan . |
| 58-120287 | 7/1983 | Japan . |

*Primary Examiner*—William L. Sikes

[57] ABSTRACT

A display panel comprises a pair of electrode plates oppositely spaced from each other. One of the electrode plates has switching elements provided with gate lines and source lines, and the other electrode plate has counter electrodes thereon. At least one of the pair of electrode plates is provided along at least one of gate lines and the source lines with non-transmissive members, and spacer members are provided between the pair of electrode plates along the non-transmissive members.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10 and 11–13 is confirmed.

New claims 14 and 15–17 are added and determined to be patentable.

*14. A display panel according to any one of claims 11–13, wherein a display unit and a color filter are combined to form one color pixel unit, and said non-transmissive metallic film is disposed at a spacing between an adjacent pair of color pixel units to form a partition.*

*15. A display panel according to claim 1, wherein said other plate is further provided with color filters each corresponding to a color pixel unit.*

*16. A display panel according to claim 15, wherein an adjacent pair of color pixel units are partitioned by the non-transmissive member.*

*17. A display panel according to claim 16, wherein the non-transmissive member is formed of a metallic film.*

* * * * *

(12) REEXAMINATION CERTIFICATE (4550th)
United States Patent
Sugata et al.

(10) Number: US 4,568,149 C1
(45) Certificate Issued: Apr. 9, 2002

(54) LIQUID CRYSTAL DISPLAY PANEL WITH OPAQUE MASK OVER GATE OR SIGNAL LINE

(75) Inventors: Masao Sugata, Yokohama; Yuko Miyajima, Tokyo, both of (JP)

(73) Assignee: Canon Kabushiki, Tokyo (JP)

Reexamination Request:
No. 90/005,637, Feb. 17, 2000

Reexamination Certificate for:
Patent No.: 4,568,149
Issued: Feb. 4, 1986
Appl. No.: 06/571,826
Filed: Jan. 19, 1984

Certificate of Correction issued Jan. 6, 1987.

(30) Foreign Application Priority Data

Jan. 28, 1983 (JP) .............................................. 58-13561

(51) Int. Cl.$^7$ ................................................. G02F 1/13
(52) U.S. Cl. ...................... 349/111; 349/106; 349/155; 349/42
(58) Field of Search ................................ 349/106, 109, 349/110, 111, 49, 51, 42, 155

(56) References Cited

FOREIGN PATENT DOCUMENTS

| JP | 55-166605 | 12/1980 |
|----|-----------|---------|
| JP | 57-39084  | 3/1982  |

*Primary Examiner*—Kenneth Parker (57) ABSTRACT

A display panel comprises a pair of electrode plates oppositely spaced from each other. One of the electrode plates has switching elements provided with gate lines and source lines, and the other electrode plate has counter electrodes thereon. At least one of the pair of electrode plates is provided along at least one of gate lines and the source liness with non-transmissive members, and spacer members are provided between the pair of electrode plates along the non-transmissive members.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–17 is confirmed.

New claims 18–23 are added and determined to be patentable.

*18. A display panel according to claim 11, wherein said non-transmissive metallic film is connected to said counter electrode.*

*19. A display panel according to claim 11, wherein a spacer member is interposed between the first and second electrode plates along said non-transmissive metallic film.*

*20. A display panel according to claim 19, wherein said spacer member is disposed as a projection on the non-transmissive metallic film.*

*21. A display panel according to claim 19, wherein said spacer member is spot-shaped, line-shaped or polygon shaped.*

*22. A display panel according to claim 11, wherein said non-transmissive metallic film is formed of chromium (Cr).*

*23. A display panel according to claim 11, wherein said non-transmissive metallic film is formed of molybdenum (Mo).*

\* \* \* \* \*